United States Patent [19]
Hostetler

[11] Patent Number: 6,061,099
[45] Date of Patent: May 9, 2000

[54] VIDEO OVERLAY CIRCUIT AND METHOD FOR OVERLAYING A VIDEO SIGNAL

[75] Inventor: David A. Hostetler, Rolling Hills Estates, Calif.

[73] Assignee: Motorola, Inc., Schaumburg, Ill.

[21] Appl. No.: 08/949,517

[22] Filed: Oct. 14, 1997

[51] Int. Cl.[7] .............................. H04N 9/76; H04N 5/268
[52] U.S. Cl. ........................ 348/584; 348/599; 348/705
[58] Field of Search ................................... 348/584, 588, 348/598, 599, 705, 706, 712, 713; H04N 9/74, 9/76, 5/268, 9/77, 9/64

[56] References Cited

U.S. PATENT DOCUMENTS

| | | | |
|---|---|---|---|
| 5,119,074 | 6/1992 | Greaves et al. | 345/154 |
| 5,903,315 | 5/1999 | Itoh | 348/564 |
| 5,907,369 | 5/1999 | Rumreich | 348/566 |

*Primary Examiner*—Sherrie Hsia
*Attorney, Agent, or Firm*—Lanny L. Parker

[57] ABSTRACT

A video overlay circuit (110) overlays a first video signal (COMPVID) with a second video signal (LUM2, CHROM2). The first video signal is partitioned by filtering out a first chrominance component (CHROM1) which is subtracted from the first video signal to produce a first luminance component (LUM1). A fast switch (5) switches between the first luminance component and a second luminance component (LUM2) of the second video signal over a transition period of clock cycles to produce an overlaid luminance signal. A slow switch (6) switches between the first chrominance component and a second chrominance component (CHROM2) of the second video signal over a transition period longer than the transition period of the fast switch to produce an overlaid chrominance signal. An adder (7) sums the overlaid luminance and chrominance signals to produce a composite output signal (VIDEO).

25 Claims, 3 Drawing Sheets

0,061,099

VIDEO OVERLAY CIRCUIT AND METHOD FOR OVERLAYING A VIDEO SIGNAL

BACKGROUND OF THE INVENTION

The present invention relates in general to video processing circuits and, more particularly, to an integrated video overlay circuit.

Video overlaying is a process in which a first video signal is at least partially covered by a second video signal. Video overlay circuits are generally used to add text or graphics to an existing video stream. For example, many television receivers overlay the incoming video signal with an overlaying signal to display channel identification or control information in the corners of the video picture. Such information is often locally generated in a cable television set top receiver. Video overlaying can be either full or partial, such that the overlaying video either obscures the incoming video or appears transparent, allowing the incoming video to partially show through the overlaying video.

In one prior art video overlay system, an overlaid video signal is generated by switching between a composite incoming video signal and a composite overlay video signal, each of which includes both chrominance and luminance components. However, the image displayed in the prior art system suffers from display errors caused by switching transients which generate chroma sidebands within the luma bandwidth that are incorrectly processed by a television receiver as luminance signals. The switching induces a change in the phase and amplitude of the output signal's chroma subcarrier, which results in ringing and other display artifacts when viewed on a television screen. If the switching times are slowed down to reduce the sidebands, the display artifacts are reduced but the bandwidth of the luminance portion is also reduced, which causes the edges of the overlaying image to appear soft, fuzzy and/or smeared.

Another prior art video overlay circuit decodes the incoming signal into either YUV or RGB component signals, switches in the corresponding overlay component signals, and then re-encodes the combined signals to produce a composite output signal. However, the decoding and encoding processes can alter or destroy information contained in the incoming signal. For example, filters in the decoder circuit effectively reduce the chroma bandwidth and result in chroma smearing when displayed. In addition, decoding often introduces phase errors in the burst lock circuit and amplitude errors in the automatic color control circuit of the decoder. Similar errors generated in the encoder circuit result in hue and saturation artifacts.

Hence, a need exists for an overlay circuit and method of overlaying a composite video signal which reduces display artifacts without increasing the cost of a television receiver.

DETAILED DESCRIPTION OF THE DRAWINGS

Figure 1:
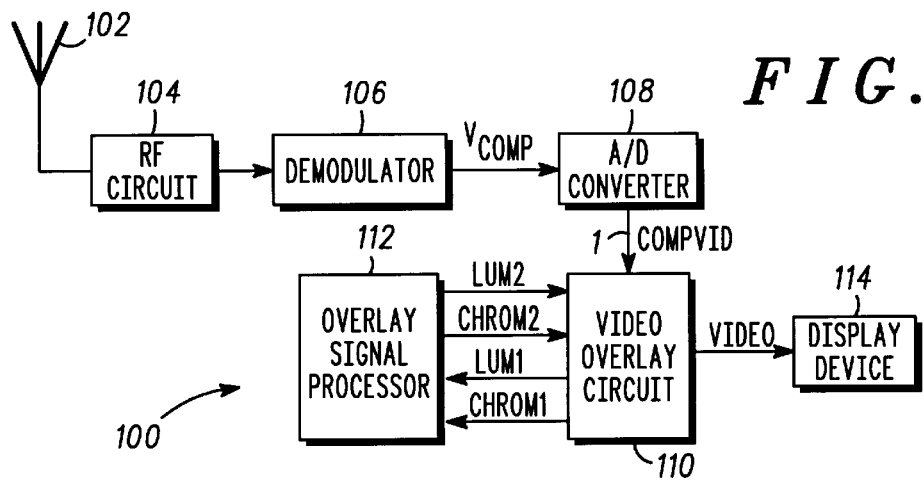
FIG. 1 is a block diagram of a television receiver.

FIG. 1 is a block diagram of a television system 100, including an input device 102, a radio frequency (RF) circuit 104, a demodulator 106, an analog to digital converter (ADC) 108, a video overlay circuit 110, an overlay signal processor 112 and a display device 114. Input device 102 receives a transmitted RF carrier signal modulated with a video signal representative of a video image. Input device 102 typically comprises an antenna or other functionally similar device such as coaxial cable for receiving a modulated RF cable television signal. RF circuit 104 selects and amplifies the carrier signal received by input device 102, and includes a local oscillator and mixer circuit for downconverting the RF signal to an intermediate frequency (IF) signal. Demodulator 106 extracts the video signal from the IF signal to produce a composite video signal $V_{COMP}$ that includes both luminance and chrominance component signals.

ADC 108 samples $V_{COMP}$ at a sample rate of 13.5 megahertz to convert the amplitude and phase information in $V_{COMP}$ to a representative video digital data stream COMPVID that preserves the information contained in $V_{COMP}$. COMPVID includes luminance and chrominance component signals LUM1 and CHROM1, respectively.

Overlay signal processor 112 includes a graphics generator that provides graphics and/or textual data such as channel or control information for overlaying on the video image. Overlay signal processor 112 receives luminance and chrominance components LUM1 and CHROM1 of COMPVID, as well as generating corresponding luminance and chrominance components of the overlay signal, LUM2 and CHROM2. LUM1 and CHROM1 function as references to align the amplitudes and phases of LUM2 and CHROM2.

Overlay signal processor 112 typically is housed in a cable television set top box and can include memory circuits for storing LUM2 and CHROM2 data. Many applications include an additional input (not shown) connected to a television cable for receiving data to update the graphic images.

Video overlay circuit 110 uses a filter circuit to partition COMPVID into luminance and chrominance components LUM1 and CHROM1, respectively, which are overlaid with LUM2 and CHROM2. Video overlay circuit 110 combines LUM1 with LUM2 and CHROM1 with CHROM2 in predefined proportions to produce an output data stream VIDEO which can be processed by display device 114. The predefined proportions are set in accordance with the desired degree of transparency of the overlaid images, which can be expressed as a percentage of the VIDEO amplitude. In the non-overlaid region of the display, LUM1 and CHROM1 have zero transparency and LUM2 and CHROM2 have 100% transparency, so that VIDEO contains no component of LUM2 and CHROM2. In the overlay region, transparency can be set to a desired level by varying the mixtures of LUM1 with LUM2 and CHROM1 with CHROM2. For example, a 50% transparent overlay signal includes equal mixtures of LUM1 with LUM2 and CHROM1 with CHROM2 such that the incoming and overlay images are equally visible in the overlay regions of the display.

It should be appreciated that even though the circuitry is shown and described as digital circuitry, the principles and teachings of the present invention are not so constrained. In many systems, digital signal processing is preferred, while other systems can derive specific benefits from implementing the present invention with analog circuits and signals. For example, current television broadcast signals are modulated with an analog composite video signal. If the overlay function is implemented in the analog domain, an ADC is not necessary and $V_{COMP}$ can be directly processed by video overlay circuit 110. Still other systems may combine analog and digital processing to benefit from specific advantages of both kinds of signals.

Display device 114 comprises a television screen, monitor or similar display device having a video input for receiving the VIDEO stream and displaying the representative overlaid image.

Figure 2:
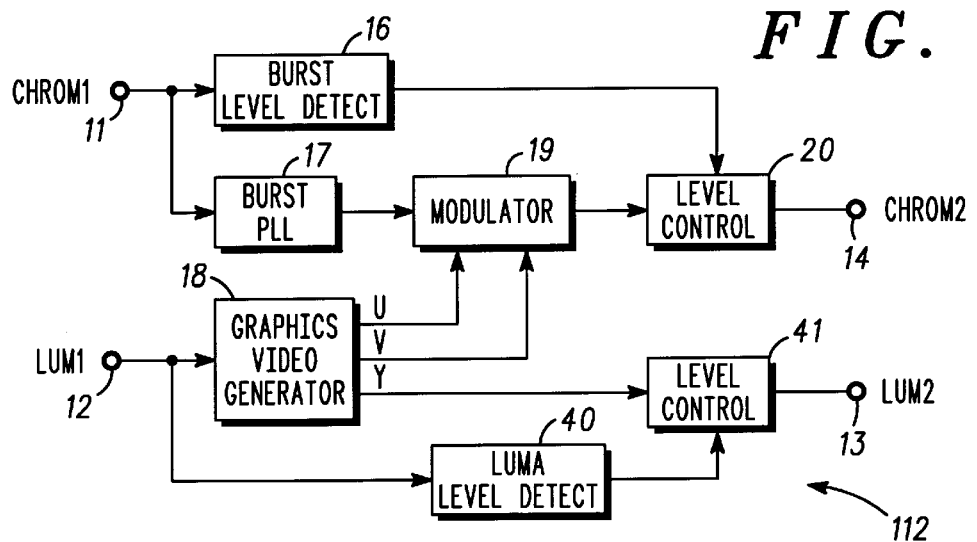
FIG. 2 is a block diagram of a video graphics generator.

FIG. 2 is a block diagram showing overlay signal processor 112 in further detail, including a burst level detector 16, a burst phase-locked loop (PLL) 17, a graphics video generator 18, a modulator 19, a luma level detector 40, and level control circuits 20 and 41. In the figures, elements having the same reference numbers perform similar functions. Overlay signal processor 112 generates LUM2 and CHROM2 as components of a graphics image to be overlaid on LUM1 and CHROM1 to produce an overlaid image. Burst level detector 16 receives CHROM1 at node 11 from video overlay circuit 110 to detect the amplitude of its color reference burst component.

Control data is produced at an output to adjust the gain of level control circuit 20 to equalize the amplitudes of CHROM2 and CHROM1. In an alternative embodiment, burst level detector 16 receives COMPVID and detects its color burst to produce the control data.

Similarly, luma level detector 40 has an input at node 12 for receiving LUM1 from video overlay circuit 110 and for detecting its amplitude. An output provides control data for adjusting the gain of level control circuit 41 to equalize the amplitudes of LUM2 and LUM1.

Burst PLL 17 generates a chroma subcarrier signal at a frequency determined by the video standard used in system 100, i.e., 3.58 megahertz in the United States. The chroma subcarrier is generated using frequency and phase information of the chroma reference burst component of CHROM1. Burst PLL 17 includes circuitry to advance the chroma subcarrier phase to offset signal delays through modulator 19 and level control circuit 20 to phase-align CHROM2 with CHROM1.

Graphics video generator 18 samples LUM1 at node 12 to produce chrominance components U and V and luminance component Y of an overlay image that are synchronized with LUM1. In an alternative embodiment, COMPVID can be sampled to synchronize the chrominance and luminance components with LUM1. Chrominance components U and V are provided at a phase that is advanced with respect to luminance component Y in order to offset the signal delay through modulator 19. When COMPVID is used as the synchronizing reference, U and V are advanced by an additional amount to match the delays through delay circuit 2 and subtractor 4. Graphics video generator 18 includes memory for storing an overlay graphics image, and can have an additional input (not shown) for downloading external images from a television cable system or the like.

Modulator 19 uses chrominance components U and V to modulate the reconstructed chroma subcarrier in a standard system format. For example, in an NTSC system, the chroma subcarrier is phase modulated with the image's instantaneous hue and amplitude modulated with the instantaneous saturation. In a particular embodiment, modulator 19 is configured to produce an output signal of a known amplitude, so the control data from burst level detector 16 can be fed forward to level control circuit 20 to set the amplitude of CHROM2 equal to that of CHROM1, which eliminates the need for negative feedback and reduces circuit complexity.

Level control circuit 20 is a programmable gain amplifier whose gain is set by data from burst level detector 16 to amplify the modulated color subcarrier to produce CHROM2 at node 14. Level control circuit 41 is a programmable gain amplifier which amplifies luminance component Y to a gain set by control data from luma level detector 40 to produce LUM2 at node 13 at an amplitude equal to that of LUM1.

Figure 3:
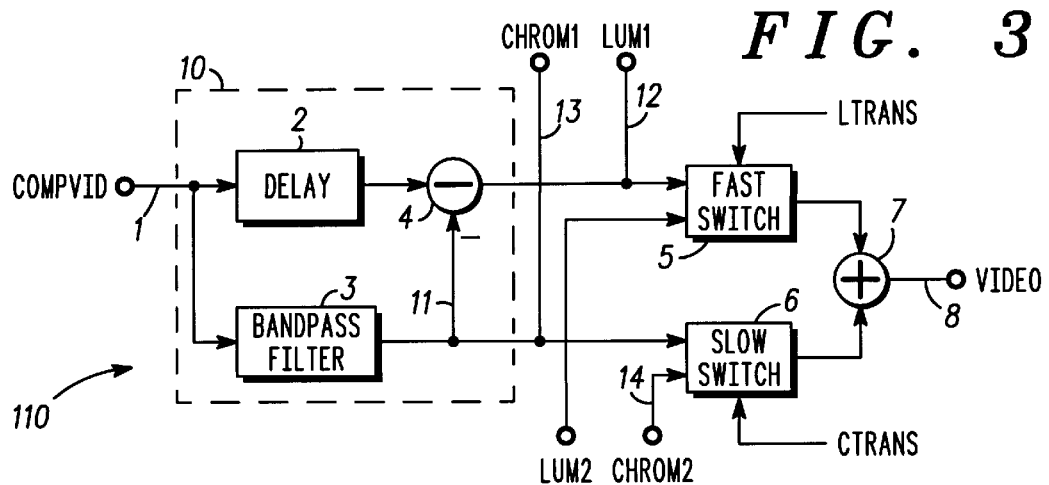
FIG. 3 is a block diagram of a video overlay circuit including a partitioning circuit.

FIG. 3 is a block diagram of video overlay circuit 110 implemented for fabrication as an integrated circuit using a standard integrated circuit process. Video overlay circuit 110 receives COMPVID at node 1 for partitioning into luminance and chrominance components LUM1 and CHROM1, respectively, in a partitioning circuit 10 that includes a band pass filter (BPF) 3, a delay circuit 2 and a subtractor 4. Video overlay circuit 110 further includes a fast switch 5 for overlaying LUM1 with LUM2 and a slow switch 6 for overlaying CHROM1 with CHROM2. The outputs of switches 5 and 6 are coupled to a combining circuit 7 to produce an overlaid composite video signal VIDEO.

BPF 3 is configured to pass frequency components of the chroma bandwidth to produce the signal designated as CHROM1. Depending on the video system of the country of operation, BPF 3 has a bandwidth between 1.0 megahertz and 2.4 megahertz with a center frequency of either 3.58 megahertz or 4.43 megahertz. Hence, CHROM1 approximates the signal commonly referred to as chrominance or "C" component of COMPVID.

It should be noted that BPF 3 need not precisely extract all chrominance information from COMPVID because selecting even a portion of this information will reduce overlay display artifacts when processed in accordance with the present invention. Therefore, neither the bandwidth nor the sharpness of the passband edges of BPF 3 are critical. For example, in the United States, the National Television Systems Committee (NTSC) video standard specifies that the chroma subcarrier operates at 3.58 megahertz with a bandwidth of ±0.6 megahertz. In such a system, a simple bandpass filter whose bandwidth is centered at 3.58 megahertz and whose band edges are defined by single pole networks whose corner frequencies are 3.18 and 4.38 megahertz significantly improves the appearance at the edges of the overlaid image. Obviously, a more selective filter, even though more complex, can provide proportionately greater improvements. Accordingly, the present invention provides a system designer with wide latitude in balancing the complexity, cost and performance of BPF 3 in the filter transition area.

Delay circuit 2 is a shift register or similar circuit operating as a delay line whose delay is matched to the delay through BPF 3 to synchronize the phases of COMPVID and CHROM1 at the inputs of subtractor 4.

Subtractor 4 produces LUM1 at node 12 by computing the difference between CHROM1 and the delayed COMPVID. Because CHROM1 is indicative of the color component of COMPVID, the remainder LUM1 computed by subtracting CHROM1 from COMPVID is representative of the signal commonly known as the luminance or "Y" component of COMPVID. Hence, COMPVID is partitioned into components CHROM1 and LUM1 which contain all of the information originally included in COMPVID. The subtraction operation of subtractor 4 is reversible in the sense that CHROM1 and LUM1 can later be combined to reconstruct COMPVID without signal damage or loss of information, as described below.

Fast switch 5 switches between LUM1 and LUM2 as the scan line reaches the edges of the overlay region of the display. Fast switch 5 includes a circuit which combines LUM1 and LUM2 in proportions indicative of the desired transparency level as set by LTRANS data. Within the non-overlay regions of the display, LUM2 is 100% transparent, or not visible, so fast switch 5 routes only LUM1 to the output. Within the overlay regions, if zero transparency (100% opaqueness) is desired for LUM2, fast switch 5 routes only LUM2 to its output.

When fast switch 5 switches between LUM1 and LUM2, the switching transient introduces frequency components that exceed the nominal luminance bandwidth. In many if not most video systems, these components can sharpen the overlay transition edges as long as they are not excessively high in frequency or amplitude. Prior art systems sometimes limit the luminance bandwidth and often suffer from soft transition edges as a result. Therefore, fast switch 5 switches between LUM1 and LUM2 over a relatively short transition period whose optimum length varies widely among the various video systems, depending on how the composite signal is subsequently processed in the television receiver or monitor. For typical systems using a 13.5 megahertz data rate, a transition period of three clock cycles achieves a high degree of sharpness at the edges of the overlay image while avoiding switching sidebands whose magnitude or frequency can create objectionable ringing or other display artifacts.

Slow switch 6 combines CHROM1 and CHROM2 in proportions representative of the transparency level to produce an overlaid chrominance signal. In order to provide uniformity in displaying color information, the proportion typically is the same as that of fast switch 5. However, chroma display artifacts at the overlay edges are reduced by configuring the chroma switching transition period to be longer than the luma transition period, as is further explained below.

Combining circuit 7 combines the overlaid luminance and chrominance signals from switches 5 and 6 to produce composite overlaid signal VIDEO at output 8. In one embodiment, combining circuit 7 is configured as an adder as shown in the figure which includes interface circuitry for driving display device 114. Recall that LUM1 was produced by subtracting CHROM1 from COMPVID in partitioning circuit 10. As a feature of the present video overlay system, combining circuit 7 effectively reverses that subtraction operation in the non-overlaid region, so that LUM1 and CHROM1 collectively contain all the information originally included in COMPVID. Hence, in the non-overlaid regions, VIDEO substantially replicates COMPVID with no loss of information.

Figure 4:
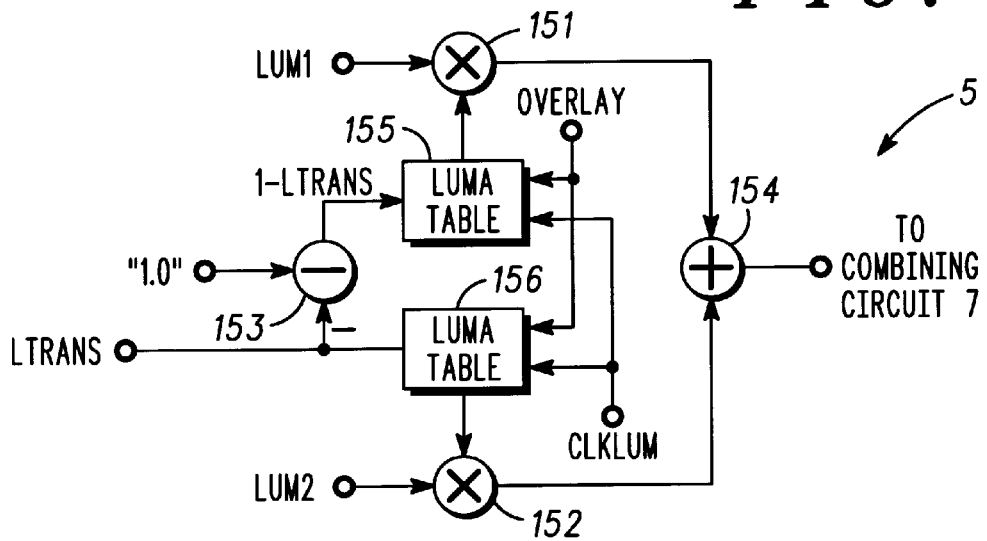
FIG. 4 is a block diagram of a fast switch.

FIG. 4 is a block diagram showing fast switch 5 in further detail, including multipliers 151 and 152, a subtractor 153, an adder 154 and luma tables 155 and 156. At the edges of the overlay image, fast switch 5 switches between LUM1 and LUM2 to produce an overlaid luminance signal. Fast switch 5 typically is configured to prevent excessively large amplitude changes when switching between LUM1 and LUM2 by interpolating the signals over a luma transition period spanning a number of clock cycles. Representing the number of clock cycles for convenience by an integer N, over the luma transition period of N clock cycles, fast switch 5 progressively decreases the magnitude of LUM1 at each clock cycle from full amplitude to its transparency amplitude, and progressively increases the magnitude of LUM2 from zero amplitude to its transparency amplitude.

During the luma transition period, LUM2 is multiplied by a series of N interpolation fractions designated as LTRANS which begin with a value 0.0 and successively increase to an end value of the LUM2 transparency level expressed as a fraction between 0.0 and 1.0. As an example of the end value, if an overlaid image of 60% transparency is desired, LTRANS has an end value of 0.6. The interpolation fractions are stored in ascending order in luma table 156 for multiplying by LUM2 in multiplier 152 to produce a series of LUM2 transition values of increasing magnitude.

On successive cycles of clock CLKLUM, luma table 156 shifts LTRANS data to multiplier 152 in ascending or descending order as determined by an OVERLAY control signal whose state depends on which portion of the signals are currently being processed. At the beginning of the overlay region, OVERLAY is asserted and N pulses of clock signal CLKLUM are applied to luma table 156 to shift LTRANS data to multiplier 152 in ascending order to increase the magnitude of LUM2 from zero to its transparency level. At the end of the overlay image, OVERLAY changes state and N pulses of CLKLUM are asserted to shift LTRANS data to multiplier 152 in descending order to reduce the value of LUM2 from its transparency level back to zero. For example, assume a transition period of three clock cycles where N=3 and LTRANS=0.5, causing interpolation data 0.0, 0.25 and 0.5 to be shifted from luma table 156. When switching into the overlay region, multiplier 152 produces interpolated signals at its output whose magnitudes are 0.0, 0.25*LUM2 and 0.5*LUM2 to increase LUM2 from 0.0 to 50% transparency over three cycles. When switching back to the non-overlay region, the data is applied in reverse order to reduce LUM2 from 50% transparency back to 0.0.

The processing of LUM1 is reversed. The interpolation fractions for LUM1 are included in a data stream designated as 1-LTRANS, which is produced by subtracting the LTRANS data values from a constant number whose value is 1.0 in subtractor 153. Therefore, the values of 1-LTRANS begin with 1.0 and decrease to the LUM1 transparency level expressed as a fraction between 0.0 and 1.0. Where an overlaid image of 60% transparency for LUM2 is desired, 1-LTRANS has a value of 0.4, to represent 40% transparency of LUM1 to maintain total luminance at 100%. On each clock cycle of the transition period, the sum of the LTRANS data and the 1-LTRANS data is 1.0, which maintains a consistent 100% luminance level between the overlay and non-overlay regions.

1-LTRANS data is stored in luma table 155 in descending order and is produced in descending or ascending order according to the value of OVERLAY. When luma table 156 is producing LTRANS data in ascending order, luma table 155 is producing 1-LTRANS data in descending order, and vice versa. That is, LUM1 is increasing while LUM2 is decreasing, and vice versa. For example, when successive output signals of multiplier 152 are 0.0, 0.25*LUM2 and 0.5*LUM2, the successive output signals of multiplier 151 are 1.0*LUM1, 0.75*LUM1 and 0.5*LUM1.

Adder 154 computes the sum of the interpolated signals from multipliers 151–152 to produce an overlay luma signal. Hence, the overlay luma signal is generated by blending the luminance components of the incoming and overlay signals over a transition period of several clock cycles to prevent large instantaneous amplitude changes at the output of adder 154 from creating display defects.

Some prior art video systems switch the luminance and chrominance signals over the same transition period. However, if chrominance signals are switched within the same transition period as luminance signals, the chroma switching transients can generate sidebands that fall outside of the chroma bandwidth. Many of the lower sidebands fall within the luminance band and therefore are interpreted and processed by a television receiver or monitor as luminance signals rather than chrominance signals. When these incorrectly processed sidebands are displayed, they appear as objectionable ringing or other artifacts at the edges of the overlaid image.

To prevent such display artifacts, slow switch 6 is configured to switch over a chroma transition period that is longer than the luma transition period of fast switch 5. The slower switching rate attenuates or suppresses the switching sidebands that fall outside of the chroma band. The degree of attenuation, and therefore image quality, is determined by the increase in the chroma transition period in relation to the luma transition period. However, virtually any increase helps to reduce the magnitude and frequency of switching sidebands falling within the luminance band and therefore has a beneficial effect in reducing display artifacts. Hence, if fast switch 5 switches luminance signals over a transition period of three clock cycles, a transition period of at least four cycles for slow switch 6 results in an improved image. For a data rate of 13.5 megahertz, the chroma transition period typically has a length between ten and twenty cycles.

Figure 5:
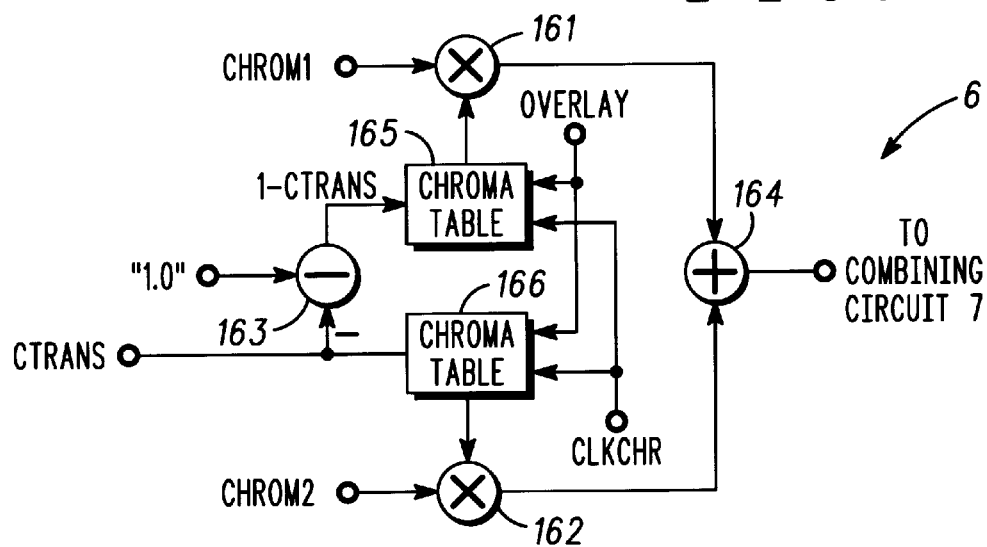
FIG. 5 is a block diagram of a slow switch.

FIG. 5 is a block diagram of slow switch 6 in further detail, including multipliers 161 and 162, a subtractor 163, an adder 164 and chroma tables 165 and 166. Slow switch 6 operates on CHROM1 and CHROM2 in a fashion similar to the way fast switch 5 operates on LUM1 and LUM2, but switches over a longer transition period than that of fast switch 5. For example, assume that the luma transition period is N clock cycles as described above. If the number of clock cycles in the chroma 25 transition period is represented by an integer M, then M is greater than N.

Slow switch 6 interpolates with an ascending series of M chroma interpolation fractions designated as CTRANS whose values begin with 0.0 and successively increase to the transparency level of CHROM2 expressed as a fraction between 0.0 and 1.0. CTRANS data is stored in chroma table 166 in order of increasing magnitude, and shifted to multiplier 162 on successive clock cycles in a direction set by OVERLAY. That is, at the beginning of the overlay image, OVERLAY is asserted and M pulses of CLKCHR are produced, applying CTRANS data in ascending order to multiplier 162 to increase the CHROM2 magnitude at the output of multiplier 162 from zero to the CHROM2 transparency level. At the end of the overlay image, OVERLAY changes logic states for clocking CTRANS data to multiplier 162 in descending order to reduce the signal magnitude at the output of multiplier 162 from the CHROM2 transparency level back to zero.

The processing of CHROM1 is reversed. A series of M descending interpolation fractions referred to as 1CTRANS is produced by subtracting the CTRANS data from a constant number whose value is 1.0 in subtractor 163. Therefore, the values in 1-CTRANS begin with 1.0 and descend to the CHROM1 transparency level expressed as a fraction between 0.0 and 1.0. On each CLKCHR cycle, the sum of the CTRANS data and the counterpart 1-CTRANS data is 1.0, which maintains a consistent 100% chrominance level between the overlay and non-overlay regions.

Chroma table 165 operates in a fashion similar to that of chroma table 166, except that when table 166 applies chroma values to the input of multiplier 162 in ascending order, table 165 applies counterpart values to the input of multiplier 161 in descending order, and vice versa. Hence, over a transition period of M cycles, CHROM2 increases from zero to its transparency level while CHROM1 decreases from full amplitude to its transparency level, and vice versa.

Adder 164 computes the sum of the interpolated signals from multipliers 161–162 to produce an overlay chroma signal. Large instantaneous magnitude changes at the output of adder 163 are avoided by blending chrominance signals CHROM1 and CHROM2 over a transition period longer than the transition period for blending LUM1 and LUM2. Such blending of the chrominance components at a slower rate than the rate at which luminance components are blended reduces display artifacts and improves image quality.

Figure 6:
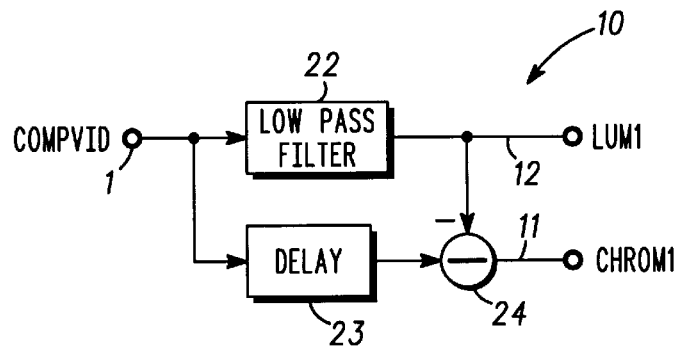
FIG. 6 is a block diagram of a partitioning circuit in an alternate embodiment.

FIG. 6 is a block diagram of partitioning circuit 10 in an alternate embodiment. A low pass filter (LPF) 22 has a cutoff frequency that extracts luminance information from COMPVID as LUM1 while blocking the chrominance signal. Delay circuit 23 is configured to match the delay through LPF 22 to synchronize LUM1 with COMPVID. Subtractor 24 computes the difference between COMPVID and LUM1 to produce CHROM1 to include primarily the chrominance information of COMPVID.

Figure 7:
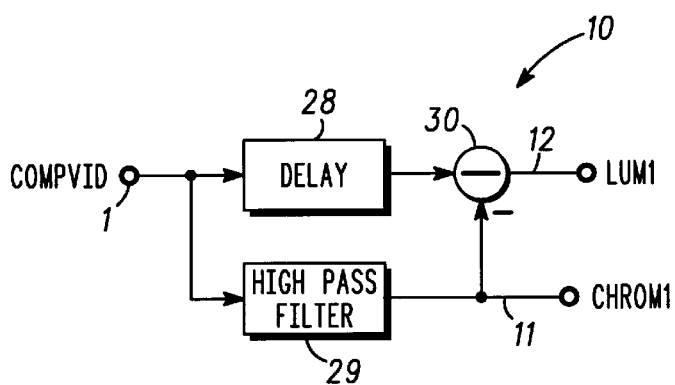
FIG. 7 is a block diagram of another embodiment of a partitioning circuit.

FIG. 7 is a block diagram of another embodiment of partitioning circuit 10. A high pass filter (HPF) 29 has a cutoff frequency that passes chrominance information of COMPVID as CHROM1 while blocking the bulk of the luminance component. COMPVID is delayed through delay circuit 28 to match the delay through HPF 29 to synchronize COMPVID with CHROM1. Subtractor 30 computes the difference between the delayed COMPVID and CHROM1 to produce LUM1 to include primarily the luminance information of COMPVID.

Figure 8:
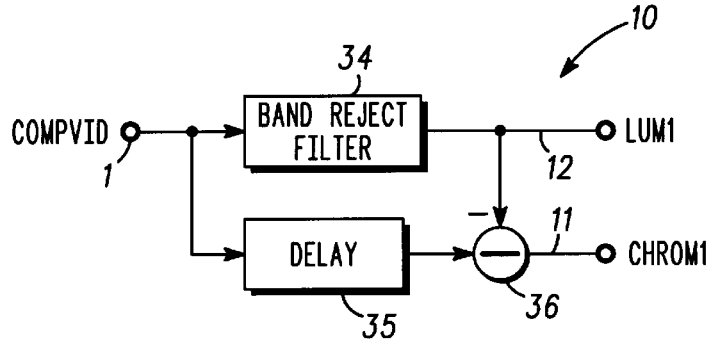
FIG. 8 is a block diagram of yet another embodiment of a partitioning circuit.

FIG. 8 is a block diagram of yet another embodiment of partitioning circuit 10. A band reject filter 34 removes chrominance information from COMPVID to produce luminance signal LUM1 at node 12. COMPVID is delayed through delay circuit 35 to synchronize COMPVID with LUM1 at the inputs of subtractor 36, which subtracts LUM1 from the delayed COMPVID to produce CHROM1 to include primarily chrominance information of COMPVID.

By now it should be appreciated that the present invention provides an improved circuit and a method of overlaying a graphics image on a background image. Display artifacts are reduced in a television or other video system which overlays an incoming signal representative of the background image with an overlay signal representing the overlaying graphics image. Switching between luminance components of the incoming and overlay signals is performed in a fast switch that switches over a relatively short transition period to produce an overlaid luminance signal having a sharp transition at the edges of the overlaid image.

A slow switch switches between chrominance components of the incoming and overlay signals to produce an overlaid chrominance signal. The slow switch switches over a longer transition period than the fast switch to suppress or attenuate switching sidebands of the overlaid chrominance signal that fall within the luminance bandwidth. By attenuating these sidebands, the longer transition period improves display quality by reducing ringing and other display artifacts at the edges of the overlaid image due to incorrectly processing the sidebands as luminance signals. The overlaid luminance and chrominance signals are combined to produce a composite overlaid signal in which the short luminance transition period preserves the sharpness at the edges of the overlaid image while the longer chrominance transition period reduces ringing and other display artifacts.

What is claimed is:

1. A video overlay circuit, comprising:
   a first switching circuit for switching between first and second luminance signals over a first transition period to produce an overlaid luminance signal;
   a second switching circuit for switching between first and second chrominance signals over a second transition period longer than the first transition period to produce an overlaid chrominance signal; and
   a circuit for combining the overlaid luminance signal and the overlaid chrominance signal to provide a composite output signal.

2. The video overlay circuit of claim 1, wherein the circuit for combining the overlaid luminance signal and the overlaid chrominance signal comprises an adder circuit.

3. The video overlay circuit of claim 1, further comprising a partitioning circuit having an input coupled for receiving a composite input signal, and partitioning the composite input signal into the first luminance signal at a first output and the first chrominance signal at a second output.

4. The video overlay circuit of claim 3, wherein the partitioning circuit includes:
   a bandpass filter having an input coupled for receiving the composite input signal and an output for providing the first chrominance signal; and
   a subtractor circuit having a first input coupled for receiving the composite input signal, a second input coupled for receiving the first chrominance signal, and an output for providing the first luminance signal as a difference between the composite input signal and the first chrominance signal.

5. The video overlay circuit of claim 4, wherein the partitioning circuit further includes a delay circuit having an input coupled for receiving the composite input signal and an output coupled to the first input of the subtractor circuit for delaying the composite input signal to synchronize the first chrominance signal with the composite input signal.

6. The video overlay circuit of claim 3, wherein the composite output signal is substantially equal to the composite input signal.

7. The video overlay circuit of claim 3, wherein the partitioning circuit includes:
   a low pass filter having an input coupled for receiving the composite input signal and an output for providing the first luminance signal; and
   a subtractor circuit having a first input coupled for receiving the composite input signal, a second input coupled for receiving the first luminance signal, and an output for providing the first chrominance signal as a difference between the composite input signal and the first luminance signal.

8. The video overlay circuit of claim 3, wherein the partitioning circuit comprises:
   a high pass filter having an input coupled for receiving the composite input signal and an output for providing the first chrominance signal; and
   a subtractor circuit having a first input coupled for receiving the composite input signal, a second input coupled for receiving the first chrominance signal, and an output for providing the first luminance signal as a difference between the composite input signal and the first chrominance signal.

9. The video overlay circuit of claim 3, wherein the partitioning circuit comprises:
   a band reject filter having an input coupled for receiving the composite input signal and an output for providing the first luminance signal; and
   a subtractor circuit having a first input coupled for receiving the composite input signal, a second input coupled for receiving the first luminance signal, and an output for providing the first chrominance signal as a difference between the composite input signal and the first luminance signal.

10. The video overlay circuit of claim 1, wherein the first switching circuit includes a first combining circuit for mixing the first and second luminance signals, and the second switching circuit includes a second combining circuit for mixing the first and second chrominance signals such that the composite output signal is displayed as a transparent image.

11. A video overlay circuit, comprising:
    a partitioning circuit having an input coupled for receiving a composite video signal, and first and second outputs for partitioning the composite video signal into a first luminance signal and a first chrominance signal;
    a first switching circuit having first and second inputs coupled for receiving the first luminance signal and a second luminance signal, respectively, and switching between the first and second luminance signals within a first transition period to produce an overlaid luminance signal at an output;
    a second switching circuit having first and second inputs coupled for receiving the first chrominance signal and a second chrominance signal, respectively, and switching between the first and second chrominance signals over a second transition period longer than the first transition period to produce an overlaid chrominance signal at an output; and
    a summing circuit coupled to the first and second switching circuits for summing the overlaid luminance signal with the overlaid chrominance signal to provide an overlaid composite output signal.

12. The video overlay circuit of claim 11, wherein the partitioning circuit includes:
    a filter circuit having an input coupled for receiving the composite video signal and producing the first chrominance signal at an output; and
    a subtractor having a first input coupled for receiving the composite video signal, a second input coupled for receiving the first chrominance signal, and an output for producing the first luminance signal as a difference between the first chrominance signal and the composite video signal.

13. The video overlay circuit of claim 11, wherein the partitioning circuit includes:
    a filter circuit having an input coupled for receiving the composite video signal and producing the first luminance signal at an output; and
    a subtractor having a first input coupled for receiving the composite video signal, a second input coupled for receiving the first luminance signal, and an output for subtracting the first luminance signal from the composite video signal to produce the first chrominance signal.

14. The video overlay circuit of claim 11, wherein the overlaid composite output signal is equal to the composite video signal when the overlaid luminance signal is equal to the first luminance signal and the overlaid chrominance signal is equal to the first chrominance signal.

15. The video overlay circuit of claim 11, further comprising an overlay signal processor having a first input coupled for receiving the first luminance signal, a second input coupled for receiving the first chrominance signal, and first and second outputs for synchronizing the second luminance signal to the first luminance signal and the second chrominance signal to the first chrominance signal.

16. The video overlay circuit of claim 15, wherein the overlay signal processor includes:
   a burst level detector for detecting an amplitude of a burst component of the first chrominance signal to adjust an amplitude of the second chrominance signal; and
   a luminance level detector for detecting an amplitude of the first luminance signal to adjust an amplitude of the second luminance signal.

17. A method of overlaying a video signal, comprising the steps of:
   switching between first and second luminance signals over a first transition period to produce an overlaid luminance signal;
   switching between first and second chrominance signals over a second transition period longer than the first transition period to produce an overlaid chrominance signal; and
   combining the overlaid luminance signal with the overlaid chrominance signal to produce a composite overlaid signal.

18. The method of claim 17, further comprising the step of filtering a composite video signal to produce the first chrominance signal.

19. The method of claim 18, further comprising the step of subtracting the first chrominance signal from the composite video signal to produce the first luminance signal, where the step of filtering includes the step of bandpass filtering the composite video signal.

20. The method of claim 19, further comprising the step of delaying the composite video signal to synchronize the first chrominance signal with the composite video signal.

21. The method of claim 18, further comprising the step of subtracting the first chrominance signal from the composite video signal to produce the first luminance signal, where the step of filtering includes the step of high pass filtering the composite video signal.

22. The method of claim 17, further comprising the step of filtering a composite video signal to produce the first luminance signal.

23. The method of claim 22, further comprising the step of subtracting the first luminance signal from the composite video signal to produce the first chrominance signal, where the step of filtering includes the step of low pass filtering the composite video signal to produce the first luminance signal.

24. The method of claim 22, further comprising the step of subtracting the first luminance signal from the composite video signal to produce the first chrominance signal, where the step of filtering includes the step of rejecting a frequency band of the composite video signal to produce the first luminance signal.

25. The method of claim 17, wherein the step of combining includes a step of summing the overlaid luminance signal with the overlaid chrominance signal to produce the composite overlaid signal.

* * * * *